April 20, 1965
R. R. COOK
3,178,869
AIR PURIFIER
Filed May 11, 1960
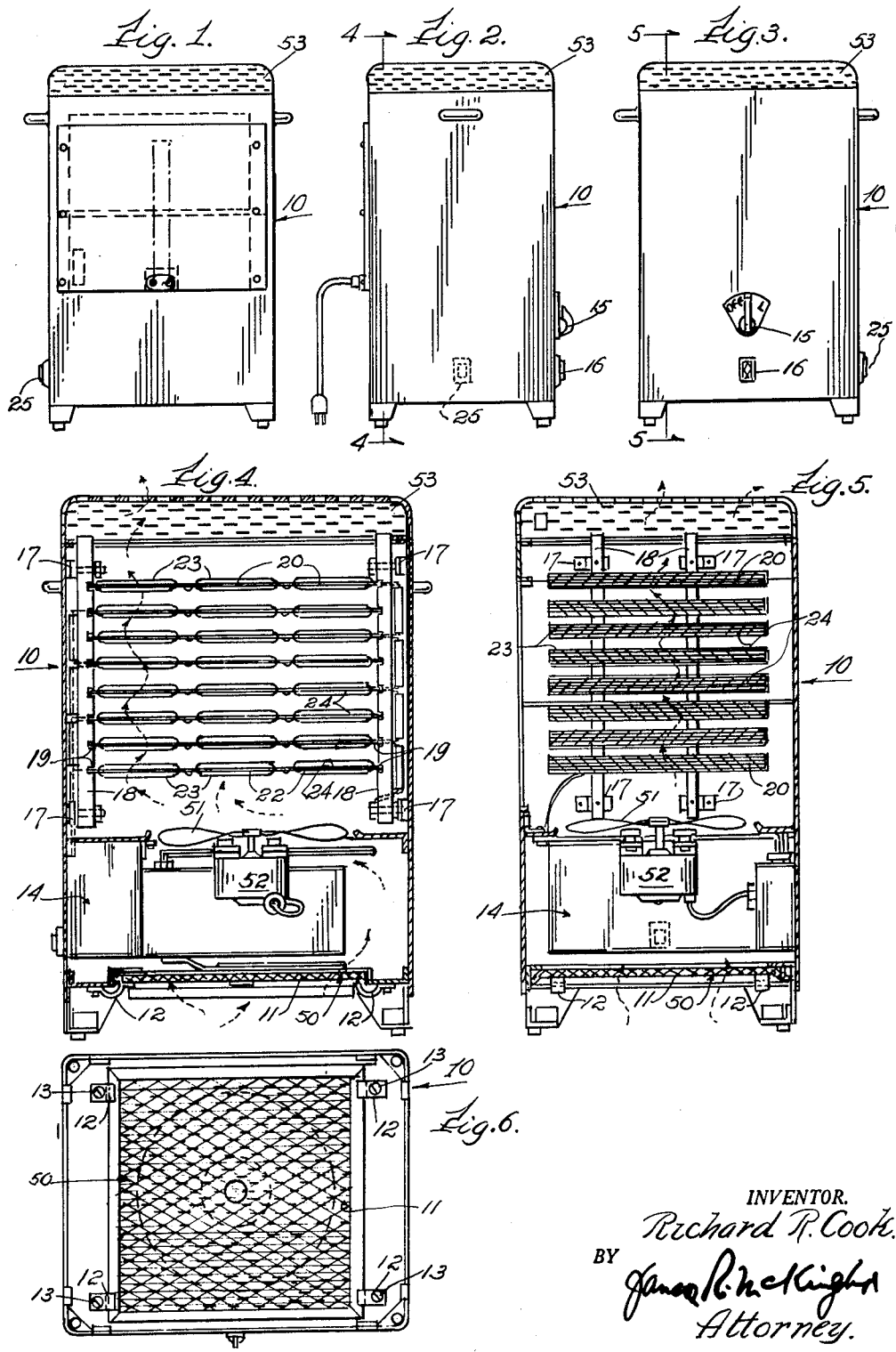
INVENTOR.
Richard R. Cook.
BY
James R. McKnight
Attorney.

3,178,869
AIR PURIFIER
Richard R. Cook, 2076 Elston Ave., Chicago, Ill.
Filed May 11, 1960, Ser. No. 28,493
2 Claims. (Cl. 55—126)

This invention relates to an air purifier adapted at the outset to remove lint, fuzz and coarse, large and heavy particles from the air by chemical adhesion and physical and mechanical filtration and then finer particles therefrom by electrostatic precipitation and chemical adhesion.

It is among the objects of my invention first to provide an efficient chemical physical filter to mechanically and physically remove lint and fuzz and other coarse, large and heavy particles from the air stream by filtration and adhesion and then to draw the air with its finer particles at an angle to and through louvered collector plates, which are electrically charged to set up high voltage fields which in turn charge the particles and attract them for collection on the collector plates.

My electrostatic precipitator is efficient in operation, because the air is made turbulent and slowed up for better collection of foreign matter as it moves at an angle to the louvered collector plates and passes through the openings therein and is directed thereby in varying directions.

Due to the wide spacing of my collector plates, they do not overfill within an ordinary year period causing them to spark and generate ozone, thereby eliminating ozone toxicity.

My invention also comprises such other objects, advantages and capabilities as will later more fully appear and which are inherently possessed by my invention. While I have described in this specification a preferred embodiment of my invention, yet it is to be understood that the same is susceptible of modification and change without departing from the spirit of my invention.

Referring to the drawings, FIG. 1 is a rear elevational view of the preferred embodiment of my air purifier; FIG. 2 is a side elevational view and FIG. 3 is a front elevational view of the same; FIG. 4 is an enlarged vertical sectional view on line 4—4 of FIG. 2; FIG. 5 is an enlarged vertical sectional view on line 5—5 of FIG. 3; and FIG. 6 is an enlarged bottom plan view of my air purifier.

The embodiment selected to illustrate my air purifier comprises a hollow body member 10 preferably formed of thin sheet metal having an air entrance opening 50 at one extremity, preferably at the bottom, covering and across which is removably mounted a primary filter 11, held by support 12 removably attached by screws 13 or the like to body member 10. Filter 11 is preferably made of expanded washable aluminum foil.

Filter 11 is coated with a fine film of a solution which is an adhesive. As air passes into the air entrance opening of the body member it passes through filter 11 which removes lint, fuzz and all coarse, large and heavy particles. The adhesive coating solution on filter 11 helps catch and permanently holds particles because they stick to the adhesive.

The solution is also germicidal and fungicidal and destroys all bacteria and virus collected. It will not dry out in hot weather and will not become fluid during humid weather. It is non-corrosive, odorless, flameproof, and electrically conductive.

Within body member 10 adjacent air entrance 50, but beyond primary filter 11, is air circulating fan 51 operated by an electric motor 52 suitably connected to an electrical source of power. Said fan pulls air within air entrance 50 and through filter 11.

An air exit 53 is provided at the top, or portion of body member 10 opposite to the entrance opening 50 for the free flow of air through the body member 10.

The interior of body member 10 is provided with a plurality of spaced brackets 17 attached thereto and extending inwardly therefrom. Attached to and extending between said brackets 17 are straps 18 having a plurality of spaced holding channels 19.

Said channels 19 removably receive and hold metal louvered collector plates 20 preferably of aluminum. Each of said plates has a plurality of diagonal fins 23 spaced by openings 24. Plates 20 are positioned by channels 19 so that they are substantially at an angle to the flow of air coming in through primary filter 11. My plates are coated with a fine film of the same solution heretofore referred to as used for coating my primary filter 11 for facilitating adhesion thereto of particles.

My channels 19 are widely spaced. I prefer that they be spaced more than an inch from each other, so that plates 20 are supported thereon substantially an inch apart.

Suitably attached to body member 10 is an electronic power supply unit 14. Said unit is a power pack suitably connected to an electrical source of power so as to transform 115 volt A.C. into 10,000 D.C. to 14,000 D.C. which is applied to alternate collector plates 20, which results in a full potential difference between each adjoining pair of collector plates. An on-off switch 15 is provided on the exterior of body member 10 for control of electric current to my air purifier. An indicator light 16 glows red when the purifier is turned on. Another amber bulb 25 glows brightly to indicate shorts or dirty plates. My device is adapted for attachment to any suitable source of electrical supply.

In use, fan 51 pulls air into air entrance 50 through primary filter 11. Lint, fuzz and other heavy, large and coarse particles stick to the adhesive coating on the primary filter 11 or are prevented mechanically from passing through primary filter and are caught therein. This removes all lint, fuzz and other coarse, large and heavy particles from the air.

The partially cleaned air then moves through the electronic field of the electrostatic plates. The smaller or finer particles are charged while passing through the magnetic field and are attracted to the collector plates. Here they stick to the adhesive solution on the plates. Here the fine particles are removed—such as lint, dust, pollen, allergenic particles, mists, molds, fluid droplets, mildew and fungus, bacteria and virus carried on the above particles as well as many other microorganisms. The cleaned air moves on to be distributed out air exit 53 for use in the room.

It is to be noted that my collector plates being positioned at an angle to the flow of air direct the air into the diagonal openings, rather than parallel to and between flat tray like plates as in the prior art. My construction causes turbulence and slows up the air for increased collection of particles. Where louver plates are formed or positioned so that the fins and openings in adjacent plates extend in opposite directions the turbulence is increased and the air further slowed up in its passage.

It is also to be noted that because my plates are widely spaced apart, that there is sufficient width to permit accumulation of caught foreign matter on the plates without quickly filling them up toward contact causing sparking between adjoining plates and the formation of ozone.

In prior art constructions, there is no primary filter to remove the heavy, large and coarse particles. In addition, the filter plates in the prior art are set from ¼ to 5/16 of an inch apart. The lint, fuzz and other large, heavy and coarse particles contacts these plates at the outset. Because the plates are so close together and the collection of particles so heavy, the particles on adjacent plates become very close together or even contact so that there is constant parking and the generation of obnoxious ozone. The more particles the plates collect, the smaller the space between them becomes. This increases the sparking and the creation of more ozone.

Such plates had to be washed ever week or 10 days to minimize the formation of ozone, and always very soon after cleaning, accumulation would again fill up the plates, causing sparking and ozone.

With my plates spaced substantially an inch apart, there can not be enough accumulation in an ordinary period of a year to create sparking and formation of ozone. The spacing, of course, greatly lengthens the periods between cleaning, because there is no clogging of the plates.

Filter 11 may be easily removed. The solution is water soluble so that the filter may be held under a faucet so that the dirt held by the solution may be easily washed off. The solution is not irritating to the hands. After the filter has been washed, it may easily be recoated and replaced in position.

The collector plates 20 may also be withdrawn from the body member and cleaned by brushing if there is only a light accumulation, or washed under the faucet if the accumulation is heavy. The plates 20 may then be recoated with a light film of the adhesive solution and replaced in the body member for further use.

My air exit 53 is preferably in the form of a plurality of spaced slitted openings at the top and adjacent the side walls of my body member 10. This provides for the diffusion of the air as it exits into the room. This diffusion is soft and eliminates the objectionable jet of air that would be forced out from a single exit. Many persons with irritated sinuses and tender membranes would be injured by such a harsh and direct flow of air and appreciate the soft diffusion of air provided by my exit construction.

My motor 52 has two speeds. One is for high speed for rapid circulation of air by fan 51. The other is for low speed for slower circulation of air by the fan and for its quieter operation. The slower speed also permits increased collection of particles and dust.

In my foregoing construction, brackets 17 are of metal and straps 18 are of glass or other suitable non-conductor material. Channels 19 are formed of metal, preferably stainless steel to permit thorough and facile cleaning with a cloth.

Having thus described my invention, I claim:

1. An air purifier comprising a body member having a hollow interior, an air entrance at one end and an air exit at the opposite end, a primary filter attached to said body member adjacent to and covering the entrance, a fan housed within said body member beyond said primary filter and connected to an electrical source of power, brackets attached to and within said body member, straps attached to said brackets and providing a plurality of channels spaced more than an inch apart, a plurality of spaced louvered plates removably supported on said channels and housed within said body member beyond said fan and positioned substantially at an angle to the flow of air coming in the air entrance, an electronic power pack connected to an electrical source of power and attached to said body member, said power pack connected with and applying high voltage to alternate plates, said primary filter adapted to remove lint, fuzz and coarse, heavy and large particles from the air before they reach the plates, said plates having a plurality of spaced diagonal fins and openings causing air turbulence and the slowing up of the passage of the air for the wide diffusion and collection of small and fine particles from the air on said plates, said plates being widely spaced substantially an inch apart, thereby insuring against the quick clogging of the plates with particles and consequent sparking therebetween and the prevention of the creation of obnoxious ozone.

2. An air purifier comprising a body member having a hollow interior, an air entrance at one end and an air exit at the opposite end, a primary filter attached to said body member adjacent to and covering the entrance, a fan housed within said body member above said filter and connected to an electrical source of power, brackets attached to and within said body member straps attached to said brackets and providing a plurality of channels spaced more than an inch apart, a plurality of spaced louvered plates removably supported on said channels and housed within said body member above said fan and positioned substantially at an angle to the flow of air coming in the air entrance, an electronic power pack connected to an electrical source of power and positioned adjacent said body member, said power pack connected with an applying high voltage to alternate plates, said primary filter made of expanded washable aluminum foil and coated with a thin film of chemical adhesive to catch and hold lint, fuzz and coarse, heavy and large particles from the air, said primary filter also adapted mechanically to remove coarse, heavy and large particles from the air before they reach the plates, said film chemical adhesive being germicidal and fungicidal, impervious to heat and cold, non-corrosive, odorless, flameproof and electrically conductive, said plates having a plurality of spaced diagonal fins and openings causing air turbulence and the slowing up of the passage of the air for the wide diffusion and collection of small and fine particles from the air on said plates, said plates also being coated with a thin film of chemical adhesive to catch and hold small and fine particles from the air, said plates being widely spaced substantially an inch apart, thereby insuring against the quick clogging of the plates with particles and consequent sparking therebetween and the prevention of the creation of obnoxious ozone.

References Cited by the Examiner

UNITED STATES PATENTS

| 297,101 | 4/84 | Baldwin et al. | 174—194 |
|---|---|---|---|
| 2,397,197 | 3/46 | Newman | 55—126 |
| 2,449,681 | 9/48 | Wilson. | |
| 2,459,644 | 1/49 | Heidebrecht | 174—139 X |
| 2,486,520 | 11/49 | Dahlman. | |
| 2,847,086 | 8/58 | Muller | 55—525 |
| 2,873,000 | 2/59 | Elam | 55—141 X |
| 2,925,881 | 2/60 | Berly et al. | 55—146 X |
| 2,936,851 | 5/60 | Cook. | |
| 2,969,127 | 1/61 | Cook | 55—126 |
| 2,989,145 | 6/61 | Goodloe | 55—525 |

FOREIGN PATENTS 67,668 11/24 Sweden.

HARRY B. THORNTON, *Primary Examiner.*

HERBERT L. MARTIN, REUBEN FRIEDMAN, WALTER BERLOWITZ, WALTER S. COLE, *Examiners.*